Figure 1:
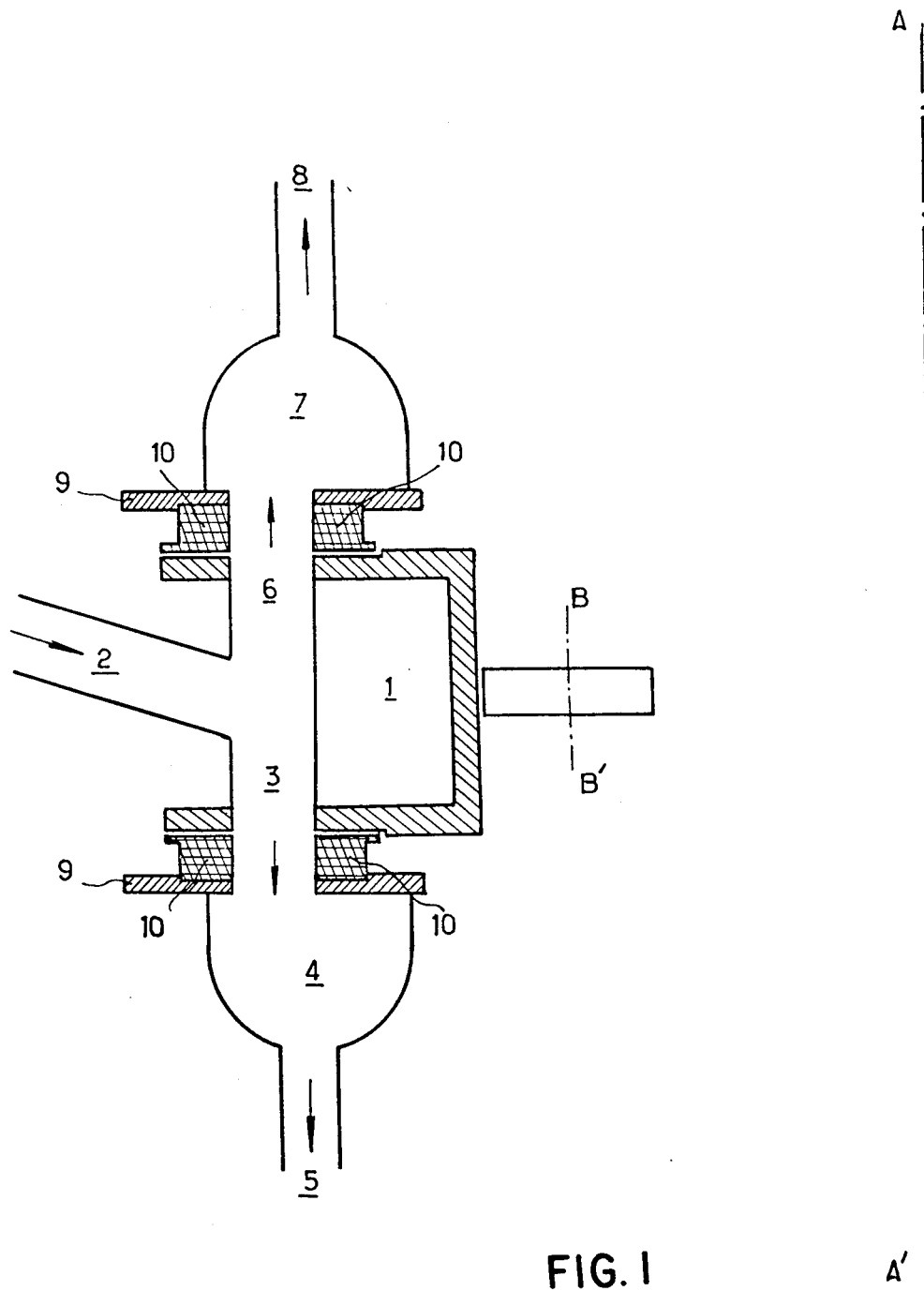

United States Patent [19]

Barloy

[11] 4,069,154
[45] Jan. 17, 1978

[54] VACUUM FILTRATION PROCESS EMPLOYING A CIRCULAR VACUUM BOX

[75] Inventor: Michel Barloy, Rouen, France

[73] Assignee: Rhone-Poulenc Industries, Paris, France

[21] Appl. No.: 616,559

[22] Filed: Sept. 25, 1975

[30] Foreign Application Priority Data

Oct. 3, 1974 France ............................... 74 33316

[51] Int. Cl.² ............................................. B01D 37/00
[52] U.S. Cl. .......................................... 210/66; 55/55;
55/189; 210/77; 210/393; 210/406
[58] Field of Search ............... 23/259.2; 55/55, 189 T;
210/66, 393, 77, 406, 82; 423/320

[56] References Cited

U.S. PATENT DOCUMENTS

| | | | |
|---|---|---|---|
| 2,362,300 | 11/1944 | Nyman | 210/393 |
| 2,677,467 | 5/1954 | Giorgini | 210/393 X |
| 3,017,247 | 1/1962 | Huxley | 423/320 |
| 3,262,574 | 7/1966 | Parmentier | 210/393 |
| 3,361,262 | 1/1968 | Orr et al. | 210/393 X |

Primary Examiner—Frank A. Spear, Jr.
Assistant Examiner—Richard W. Burks
Attorney, Agent, or Firm—McDougall, Hersh & Scott

[57] ABSTRACT

A process which enables a mixture of liquid and gas, coming from a rotary vacuum filter, to be collected and simultaneously separated.

The mixture of gas and liquid is passed from the filter into a vacuum box provided with a space which rotates around the axis of the filter and is generally of circular shape, in which the liquid and gas separate, the liquid is introduced into a lower fixed space generally in the shape of a circular channel, and the gas is introduced into an upper fixed space generally in the form of a circular channel, so that the liquid and gas are collected separately.

The process and the apparatus of the invention are advantageously employed in circular table filters divided into filtration zones and provided with wash means, especially in the manufacture of phosphoric acid by the wet method.

6 Claims, 2 Drawing Figures

VACUUM FILTRATION PROCESS EMPLOYING A CIRCULAR VACUUM BOX

The invention is an improvement relating to vacuum filtration; in particular it concerns continuous circular rotary filters provided with circular vacuum boxes, and more especially the filters which comprise wash means and a device or arrangement for collecting separately the different filtrates.

In vacuum filters, air is aspirated through the filter cake and is found mixed with liquid. After having collected the mixture in a vacuum box, it is necessary to separate the air from the liquid in order to avoid the disturbances which would otherwise be produced in the operation of the pumps, and in order to prevent entrainment of liquid in the vacuum system.

A separation is generally carried out by connecting each outflow liquid to a receiving vessel having a volume which is sufficient to enable the liquid to flow out under gravity and the gas to be aspirated to the upper part and then evacuated. Such receiving vessels are expensive and cumbersome, and must be kept constantly free from blockage by periodic washing. Furthermore, they give rise to pressure drop.

One of the objects of the invention is to simplify the vessels and thus reduce the aforementioned disadvantages.

Circular rotary filters, for example the horizontal filters provided with wash means and used in particular in the manufacture of phosphoric acid by the wet method, are divided into so-called "filtration cell" sectors by radial partitions.

Hereinafter "filtration zone" will denote a fixed sector covering a certain number, not necessarily a whole number, of filtration cells on which a specific operation of the process is carried out: for example filtration of the mother liquor, washing of the filter cake, blowing of the filter cake, washing of gauzes, or drying.

Each filtration zone, like each filtration cell, provides a filtrate of given concentration.

Each filtration cell is connected in the axial region of the filter to the vacuum box or distribution box. This comprises a movable distributor provided with a plurality of openings enabling each filtration cell to be brought into communication, in succession, with the compartments of the fixed part of the vacuum box. In principle one compartment corresponds to each filtration zone, thus enabling the different filtrates to be separately collected.

In the manufacture of phosphoric acid by the wet method, after the wash water has passed through the very weak acid filtration zone of the filter, into the vacuum box and then into a separator, it is recycled to the weak acid filtration zone. In a similar manner, the weak acid is recycled to the average concentration acid filtration zone. The whole series of these recycling operations constitutes the wash process.

The process, which is the object of the invention, enables a liquid and a gas mixed together, and coming from a rotary filter under a vacuum provided with a circular vacuum box, to be collected and simultaneously separated. In accordance with the invention, the gas/liquid mixture coming from the filter is fed into a vacuum box provided with a rotating space around the axis of the filter, said space being of generally circular shape, in which the gas and liquid separate. The liquid is introduced via at least one lower opening into a lower fixed space, generally in the form of a circular channel, while the gas is introduced by at least one upper opening into an upper fixed space, generally in the form of a circular channel, so that the liquid and gas are collected separately, and the moving (rotating) space is connected to the two adjacent fixed spaces in a liquid- and gas-tight manner.

More particularly, the filter is divided into several filtration zones, each of these zones providing a separate filtrate. The lower fixed space of the vacuum box is divided radially into as many compartments as there are filtration zones in the filter, each compartment communicating with a filtration zone so that each filtrate is collected separately and separated from the gas.

The process of the invention is generally employed in an apparatus comprising a combination of three parts, namely, a first, middle part revolving around the vertical rotation axis of the filter and consisting of the assembly of all the approximately horizontal inlets of the pipes carrying the liquid and the gas coming from the filter, each inlet terminating in a vertical coupling open at the top and bottom, the lower and upper ends being joined to one another by a rigid ring provided with a sealing joint; a second, fixed lower part consisting of a circular channel whose base is directed downwards and on which the moving, middle part is supported and glides during its rotation; and a third, fixed upper part consisting of a circular channel whose base is directed upwards, the said fixed upper part resting on the upper sealing joint of the moving part.

The fixed lower part has openings enabling liquids to be removed from the bottom, and the upper fixed part has openings enabling gases to be removed from the top.

When the arrangement of the invention is operating, the moving part is driven by the rotational movement of the filter. The moving part of the apparatus of the invention is advantageously driven by two or three arms arranged radially and spaced apart by an angle of 180° or 120°. The liquid coming from the filter, which is mixed with gas, arrives in the approximately horizontal part of the pipes, where a first separation takes place, and the liquid then passes towards the bottom and collects in the lower part, whereas the gases are aspirated towards the top by a vacuum circuit.

In a variation of the apparatus intended more especially for employing the process of the invention in filtration, using wash procedures, the lower fixed part is divided into compartments by means of radially disposed vertical partitions. The arrangement of these partitions determines the respective size of the compartments. In accordance with a preferred embodiment, at least one of these vertical partitions is a partial partition so that the adjacent compartments intercommunicate by overflow of liquid.

In the whole system of recycling steps, which constitutes the wash procedure, the concentration of the liquids varies from the wash water up to the concentrated filtrate.

Furthermore, in each compartment, the liquid collected does not have a uniform concentration, and the concentration varies continuously from one end of the compartment to the other so that a proportion of the liquid whose concentration differs from the average concentration of the compartment can be made to overflow along one or other partition.

Thus, in the production of phosphoric acid by the wet method, the preferred variant of apparatus described above enables a part of the filtrate, having a concentration slightly less than the concentration of the remainder of the compartment, to overflow from the strong acid compartment. This part is collected in a circuit outside the production, the remainder of the strong acid compartment constituting the said production. In the known processes only a liquid having the average concentration of the compartment could be recovered.

Again, in the production of phosphoric acid by the wet method, the same variant of apparatus as described above enables a part of the filtrate of relatively highest concentration, in the compartment, to overflow from the weak acid compartment; this portion is collected in the average acid concentration compartment and the remaining, the most dilute portion, is kept for recycling to the wash zone of the filtration cake.

The invention will now be described with reference to FIGS. 1 and 2 of the drawings, which are given by way of illustration and not by way of limitation.

FIG. 1 is a diagrammatical, vertical section of the apparatus of the invention, which extends on both sides of the rotational axis AA' of the filter, only one half being shown in the figure. The axis of a centering roller is shown at BB'.

1 represents the middle part rotating around the axis AA', and 2 denotes a section of one of the inlets for liquid mixed with gas, coming from the filter. The lower end 3 of the inlet 2 communicates with the lower fixed part 4, where the liquid is collected and leaves at 5. The upper end 6 communicates with the upper fixed part 7, where the gas is collected and leaves at 8. 9 is a section of the rings which are each provided with a sealing joint 10. These rings connect the upper and lower ends.

Figure 2:
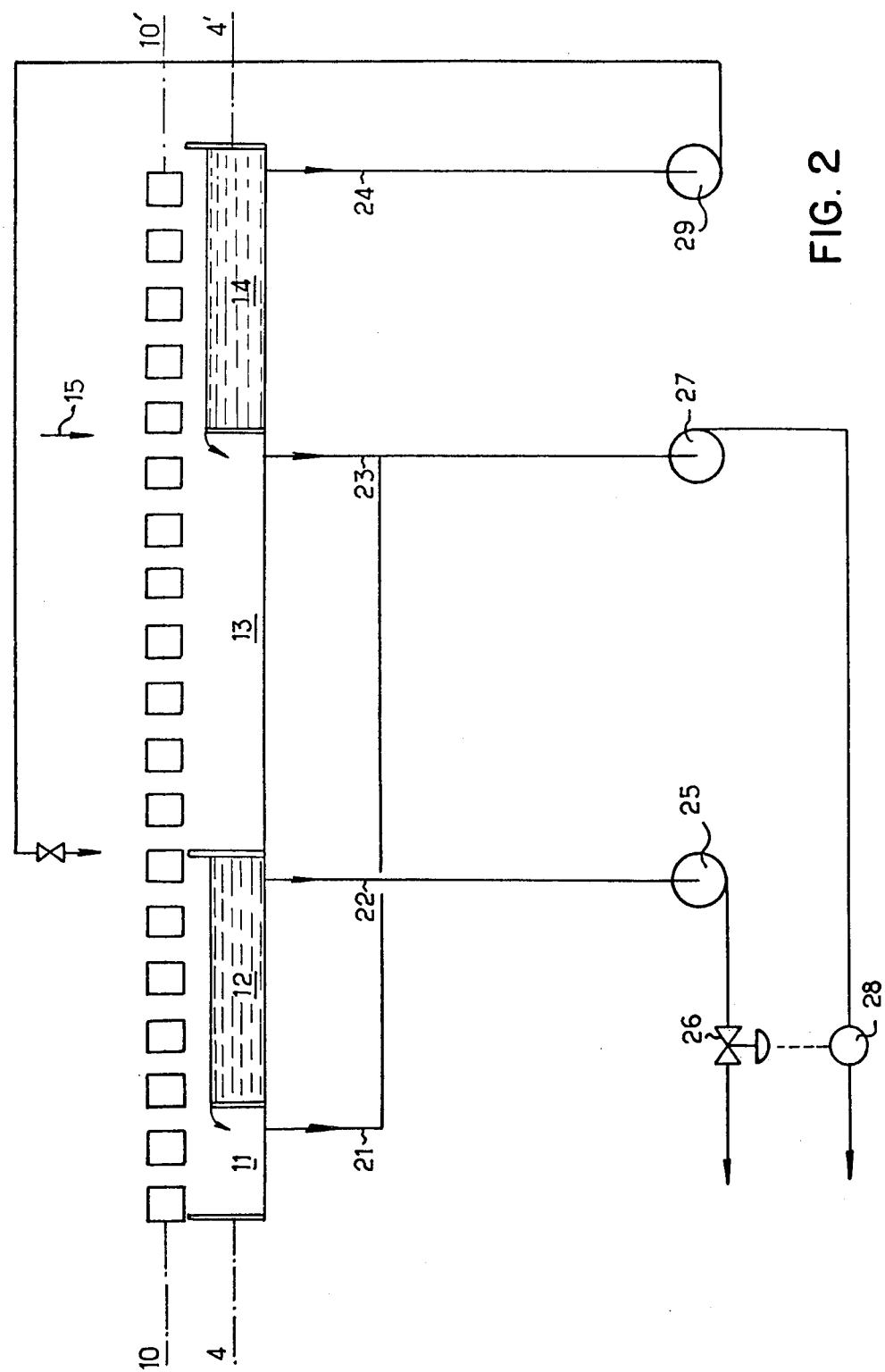

FIG. 2 is a view of the vacuum box of the invention according to an opened-out vertical cross-section, that is to say, for the sake of clarity in the explanation, it is assumed that the apparatus has been cut and opened out so as to make it rectilinear. The lower fixed part 4 of the apparatus is shown as being opened out along its whole length, at 4-4', and the same is true for the sealing joint 10 seen at 10-10'.

11, 12, 13 and 14 denote respectively the compartments termed presector, strong acid, average acid and weak acid.

The first filtrate, slightly diluted with water and whose filter gauzes are impregnated after washing, is collected in compartment 11 and is removed by an outlet pipe 21 located under this compartment.

The second filtrate, which constitutes the production, is collected in the compartment 12 and is removed by an outlet pipe 22 communicating with the bottom of this compartment. A pump 25, whose suction line is directly connected to pipe 22, conveys the production to the storage container via a regulation valve 26 located in the delivery of this pump. The excess filtrate in the compartment 12 overflows into compartment 11, and the separation between these two compartments is a partial partition. The portion of concentrated filtrate, which thus overflows, contains the small amount of moisture from the gauzes which would not be retained in the compartment 11. This moisture is found in the first filtrate, which is recycled outside the production.

The third filtrate, collected in compartment 13, is removed by an outlet pipe 23 communicating with the bottom of this compartment and connected to the pipe 21. A pump 27 conveys these two filtrates to the treatment reactor, not shown, via a flowmeter 28 which regulates the regulation valve 26 of the concentrated filtrate.

The fourth filtrate is collected in the compartment 14 and is removed by an outlet pipe 24 connected to the suction line of a pump 29 which feeds this filtrate to the wash procedure filter for the filter cake. Any possible excess of this acid overflows into the compartment 13, the part which overflows being the most concentrated acid from compartment 14, with the result that the liquid used in the wash procedure is less concentrated. This is favorable to the wash yield of the cake. A final wash is carried out by water introduced at 15.

EXAMPLE

A vacuum box of the invention, similar to that shown diagrammatically in FIG. 1, is mounted under a horizontal rotary table filter under a vacuum, having 150 m$^2$ of surface area, which represents 80% of the total surface area, and which is used in the wet method manufacture of phosphoric acid, involving the filtration of gypsum. The vacuum box, which is driven by the table, rotates at a rate of one revolution per two minutes.

The lower fixed part and the upper fixed part are both constructed in the form of a channel, the cross-sections of each channel being identical for reasons of simplicity.

In the inlet pipe 2 for the liquid and gas coming from the filter, which is 165 mm in diameter and is connected to a vertical pipe of the same diameter, the gas has a velocity of 11 m/s and the liquid a velocity of 2 m/s. The diameter of the channels of the vacuum box is 2400 mm. In the vertical downflow pipe 3 for the liquid, the velocity is 2 m/s. In the vertical upflow pipe 6 for the gases, the velocity is 10 m/s.

The separation of liquid and air is as efficient as in the conventional separation apparatus. It is found, in fact, that there is practically no liquid entrained with the gas, and no gas in the phosphoric acid.

The apparatus, which may advantageously be employed in all filtrations operating in vacuo, enables both the bulk size and the construction costs of the installations to be reduced. From maintenance results, it is found that there is a reduction in pressure drop and in blockages.

The lower compartmentalized part of the vacuum box is used for transferring acid, which thus avoids the circuits and external tanks normally used for the recirculation. The separation of the filtrates is more selective than in the usual systems; in fact, an additional selection is effected by simple overflow measures in the preferred variant of apparatus described above. The control of the sizes and positions of the partitions is easily performed. By employing this variant, both the concentration of the strong acid and the wash yield of the cake are improved.

The application to the phosphoric acid industry is particularly advantageous.

I claim:

1. A process enabling a mixture of liquid and gas coming from a rotary vacuum filter which is divided into a number of filtration zones for separation of the filtrate to be collected and simultaneously separated, comprising passing the liquid/gas mixture into a vacuum box provided with a generally circular space which rotates about the axis of the filter, and in which the liquid and gas separate, draining the separated liquid via at least one lower opening into a lower fixed space while the separated gas rises via at least one upper opening into an upper fixed space so that the liquid and the gas are collected separately, the moving rotating space being connected to the two adjacent fixed spaces in a liquid-tight and gas-tight manner, the lower fixed space of the vacuum box being divided radially into the same number of compartments as the filtration zone and which includes the step of communicating each compartment with a filtration zone so that each filtrate is separate from the gas.

2. The process as claimed in claim 1 in which the lower fixed space and the upper fixed space are in the form of a circular channel.

3. In combination with a horizontally disposed rotary filter, a first middle part mounted for rotational movement about the vertical rotational axis of the filter and including inlets for receiving the liquid and gas from the filter, each inlet communicating with a vertical coupling open at the top and bottom, a rigid ring joining the lower and upper ends of the couplings in sealing relation, a second fixed lower part consisting of a circular channel on which the moving middle part is supported for relative rotational movement with the open bottom ends of the couplings in communication therewith for receiving the liquid, and a third fixed upper part consisting of a circular channel resting on the upper sealing joint of the moving part with the open top ends of the couplings in communication therewith for receiving the gas, vertically extending radial partitions dividing the lower fixed part into compartments, in which at least one of the partitions is a partial partition so that adjacent compartments communicate for overflow of liquid from one of said compartments to the other.

4. Apparatus as claimed in claim 3 in which the lower fixed part comprises outlets enabling liquid to be removed at the bottom and the upper fixed part comprises outlets enabling gas to be removed at the top.

5. Apparatus as claimed in claim 3 in the manufacture of phosphoric acid by the wet method characterized in that the portion of the filtrate of relatively lowest concentration overflows from the strong acid compartment and means are provided for collecting the overflow in an independent circuit, the remainder of the strong acid compartment representing production.

6. Apparatus as claimed in claim 3 in the manufacture of phosphoric acid by the wet method, characterized in that a portion of the filtrate of relatively highest concentration overflows from a weak acid compartment into an average concentration acid compartment, and means for recycle of the remainder of the weak acid to the washing of the filter cake.

* * * * *